United States Patent [19]

Costelli et al.

[11] Patent Number: 4,601,681
[45] Date of Patent: Jul. 22, 1986

[54] HYDRAULIC CONTROL APPARATUS AND AN AUTOMATIC GEAR BOX FOR MOTOR VEHICLES

[75] Inventors: Ugo Costelli, Turin; Giulio Dotti, Milan; Luciano Moretti, Turin, all of Italy

[73] Assignee: Fiat Auto S.p.A., Turin, Italy

[21] Appl. No.: 711,072

[22] Filed: Mar. 12, 1985

Related U.S. Application Data

[63] Continuation-in-part of Ser. No. 346,412, Feb. 8, 1982, abandoned.

[30] Foreign Application Priority Data

Jul. 17, 1981 [IT] Italy ................. 67992 A/81

[51] Int. Cl.[4] .......................... F16H 11/04
[52] U.S. Cl. .......................... 474/28; 474/11
[58] Field of Search .......... 474/28, 8, 11, 18, 30, 474/137; 74/689, 867, 868, 730, 731

[56] References Cited

U.S. PATENT DOCUMENTS

| 3,662,621 | 5/1972 | Hirozawa | 74/731 |
| 3,893,344 | 7/1975 | Dantlgraber et al. | 74/867 |
| 3,918,312 | 11/1975 | Espenschied et al. | 474/18 |
| 3,954,018 | 5/1976 | O'Berto | 474/11 |
| 4,095,486 | 6/1978 | Ohnuma | 74/731 X |
| 4,152,947 | 5/1979 | Van Deursen et al. | 474/28 |
| 4,317,389 | 3/1982 | Falzoni | 74/689 |
| 4,357,806 | 11/1982 | Harris et al. | 474/11 |

FOREIGN PATENT DOCUMENTS

| 61732 | 10/1982 | European Pat. Off. | 474/18 |
| 90450 | 6/1982 | Japan | 474/11 |
| 567210 | 9/1975 | Switzerland | 474/28 |
| 2058256 | 4/1981 | United Kingdom | 474/18 |

Primary Examiner—James A. Leppink
Assistant Examiner—Frank McKenzie
Attorney, Agent, or Firm—Frost & Jacobs

[57] ABSTRACT

The present invention relates to an automatic gear box and a control therefor of a motor vehicle, including two pulleys connected by a transmission belt (driving belt), each of which is formed by a couple of disks, of which one is movable in regard to the other one, in order to vary the winding radius of the belt. The control for the automatic gear box includes an hydraulic circuit which incorporates a number of actuating cylinders, a couple of delaying valves and a valve for issuing a fluid gradually and under increasing pressure only if the inlet pressure is above a preestablished value.

5 Claims, 1 Drawing Figure

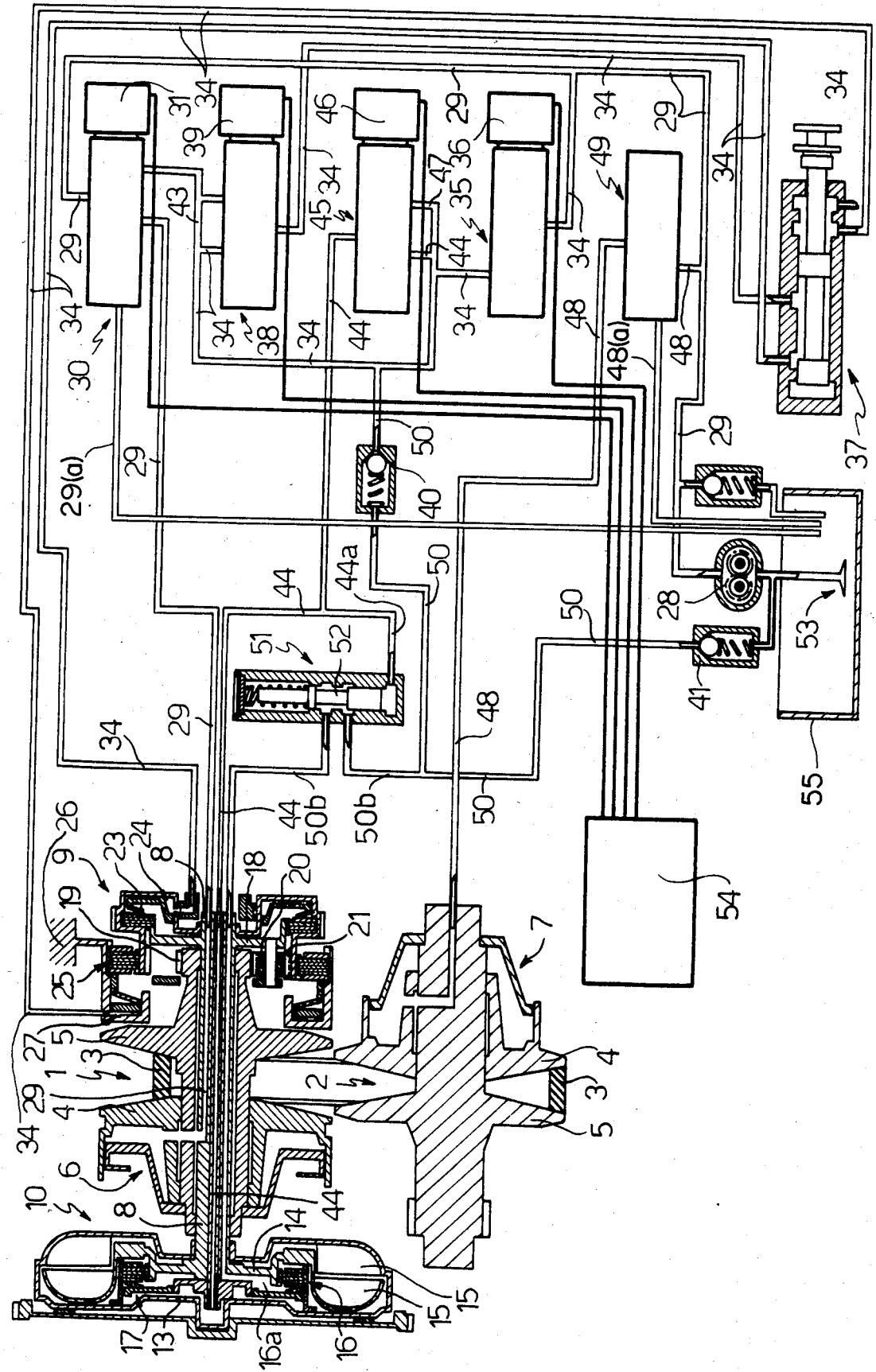

HYDRAULIC CONTROL APPARATUS AND AN AUTOMATIC GEAR BOX FOR MOTOR VEHICLES

This application is a continuation-in-part of application Ser. No. 06/346,412, filed Feb. 8, 1982, now abandoned.

BACKGROUND OF THE INVENTION

The present invention relates to a hydraulic control apparatus and an automatic gear box for a motor vehicle of the kind comprising a driving pulley, a freely rotating pulley and a transmission belt for transferring motion from the driving pulley to the freely rotating pulley. Each pulley comprises a pair of parallel disks, one of which is movable with respect to the other, in order to continuously vary the winding radius of said transmission belt on each pulley.

The automatic gearbox is equipped with a reduction and reverse gear unit which is incorporated between the driving shaft and the driving pulley. The reduction and reverse gear unit comprises a first and second friction clutch, each driven by respective hydraulic cylinders, wherein said clutches are arranged for transmitting motion from the driving shaft to the driving pulley which determines the forward or reverse movement of a motor vehicle.

In order to control the aforementioned gear box, sensors able to detect various operating conditions of the motor vehicle and devices capable of sensing kinematic motion are employed to automatically actuate the hydraulic cylinders which control the first and second friction clutches.

SUMMARY OF THE INVENTION

It is an object of the present invention to provide a control device and a continuous automatic gear box of relatively simple and cheap construction and operation, and of rapid and precise regulation suitable for application for many different types of motor vehicles.

According to the present invention, a main hydraulic fluid circuit fed from a source of fluid under pressure to the hydraulic cylinder associated with said movable disk of said driving pulley, includes a drain unit and a flow regulating valve.

A secondary duct, coupled to said main duct, between the source of fluid under pressure and the flow regulating valve, transmits hydraulic fluid from the source of fluid under pressure to the hydraulic cylinder associated with the movable disk of said freely rotating pulley.

A third duct fluidly connected to said main duct, between the secondary duct and the flow regulating valve, includes a pressure regulating valve and optionally a delaying valve, and transmits hydraulic fluid from the source of fluid under pressure to either the first or second friction clutch of the reduction reversing unit.

BRIEF DESCRIPTION OF THE DRAWING

A detailed embodiment of the apparatus of the present invention will now be described with reference to the drawing which shows schematically the basic components of the gear box and its associated control system.

DETAILED DESCRIPTION OF THE INVENTION

It is possible to continuously vary the gear or transmission ratio of the automatic gear box by modifying the winding radius of the driving belt which connects the driving pulley with the freely rotating pulley. The automatic gear box, illustrated schematically in the drawing, comprises a driving pulley 1, driven by an engine (not shown) and a freely rotating pulley 2, typically connected to the rear wheel, the freely rotating pulley 2 and driven pulley 1 are connected by a belt 3 having a substatially cross-section. Each pulley includes a pair of disks 4 and 5, the first of which is movable in an axial direction thus creating a recess or gap of predetermined dimension between the axially movable disk and the stationary disk. The predetermined dimension corresponds directly to a specific winding radius for belt 3 which in turn yields a specific transmission or velocity ratio. The mobile disks 4 of both the driven pulley 1 and the freely rotating pulley 2 are actuated by an associated hydraulic cylinder 6 and 7, respectively, wherein the mobile disk 4 represents the piston of the associated hydraulic cylinder. Driving pulley 1 is integrally connected with driving shaft 8, through an epicyclical rotational reduction-reversing unit 9. The driving shaft 8 is connected with the motor vehicle engine (not shown) through hydraulic joint 10 comprising a first half joint 13 and a second half joint 14. The first half joint 13 is integral with the engine flywheel and the second half joint 14 is integral with driving shaft 8. Each half joint includes vanes 15 and surrounding circular walls to maintain an annular cavity generally filled with hydralic fluid. The hydraulic fluid in the annular cavity creates a drag force on the rotation of the second half joint 14 when the first half joint 13 is rotated by the engine.

The first and second half joints 13 and 14 are actuated by a friction clutch 16, and the corresponding associated hydraulic cylinder 17, which actuates clutch 16, is adapted to rigidly connect the two half joints to one another as is well known to those skilled in the art. Motion is transmitted from the driving shaft 8 to the epicyclical rotational reduction-reversing unit 9 through a train-holder 18 and a sun gear 19. Sun gear 19 is integral with driving pulley 1 through gears 20 and ring gear 21 of the reduction-reversing unit 9. A friction clutch 23 is positioned between train-holder 18 and ring gear 21, and is adapted upon activation to cause the reduction-reversing unit 9 to transmit motion from the driving shaft 8 to driving pulley 1 so as to cause forward movement of the motor vehicle. Friction clutch 23 is actuated by hydraulic cylinder 24. Another friction clutch 25 is positioned between the frame 26 of the gear box and ring gear 21, which upon activation causes the reduction-reversing unit 9 to transmit motion from driving shaft 8 to the driving pulley 1 to cause the motor vehicle to travel in the reverse direction. Friction clutch 25 is actuated by corresponding hydraulic cylinder 27.

During the starting operation of the vehicle, the clutch 16 is disengaged and thus no motion is transmitted from the engine to driving shaft 8 through the hydraulic joint 10. Once the vehicle has been started, clutch 16 is engaged by rigidly connecting the two half joints 13 and 14. This is accomplished because the consumption of the energy by the motion of hydraulic fluid inside joint 10 is reduced by permitting the two half joints 13 and 14 to solidly engage each other.

The control device of the invention includes a source of fluid 55, a pump 28, and a duct 29 to feed the hydraulic fluid to hydraulic cylinder 6, which actuates the displacement of mobile disk 4 of the driving pulley 1. Between the pump 28 and the hydraulic cylinder 6, and fluidly connected with duct 29 is a flow regulating valve 30 which is operated by electromagnet 31.

The flow regulating valve 30 regulates the quantity of hydraulic fluid permitted to flow to the hydraulic cylinder 6. The intensity of the signal or electrical pulse sent to the electromagnet 31 determines the flow proportion of the hydraulic fluid fed to hydraulic cylinder 6. When electromagnet 31 causes the flow regulating valve 30 to be in a first position, the source of hydraulic fluid under pressure is in communication with hydraulic cylinder 6. When the flow regulating valve 30 controlled by the electromagnet is in the second position, the hydraulic cylinder 6 is in communication with a drain line 29a which is connected with the source of fluid 55. Depending upon the intensity of the signal sent to electromagnet 31, it is possible to position the flow regulating valve in a multitude of positions between the first and second positions, so as to enable control of the quantity of hydaulic fluid fed to hydraulic cylinder 6. In this way, it is possible to select in advance the necessary quantity of hydraulic fluid fed to hydraulic cylinder 6 so as to position movable disk 4 of the driving pulley 1 in a manner that is both proportional to the flow of the hydraulic fluid and directly related to the peculiar conditions of the motor vehicle.

Duct 34 is in fluid communication with duct 29 between the pump 28 and the flow regulating valve 30. Duct 34 fluidly connects the source of fluid under pressure with either hydraulic cylinder 24 or hydraulic cylinder 27, which correspondingly actuates either friction clutch 23 or friction clutch 25, respectively. Fluidly communicating with duct 34 is a pressure regulating valve 35 controlled and operated by electromagnet 36. Pressure regulating valve 35 permits the feeding of hydraulic fluid between the source of fluid 55, which is under pressure by means of pump 28, and the hydraulic cylinders 24 or 27. The pressure regulating valve 35 adjusts the pressure in duct 34 in response to an electric signal or pulse sent to electromagnet 36. A duct 50 is in fluid communication with duct 34 immediately after or downstream of pressure regulating valve 35. Duct 50 is equipped with two pressure limiting valves 40 and 41, which maintain a constant preestablished pressure inside both duct 50 and the section of duct 34 which is after or downstream of pressure regulating valve 35.

The main circuit comprises the source of fluid under pressure and the pump 28 with ducts 29 and 34 and 50 along with the associated valves 30, 35, 40 and 41. The pressure downstream or after pressure regulating valve 35 is essentially constant and established by adjustment of valves 40 and 41. The pressure upstream of valve 35 can be increased by electromagnet 36.

Fluidly connected with duct 34 after or downstream of pressure regulating valve 35 is a selecting valve 37, which can be actuated through a gear lever to permit feeding of hydraulic fluid to either hydraulic cylinder 24 or hydraulic cylinder 27, which selectively actuates either corresponding clutch 23 or corresponding clutch 25, respectively.

Valve 35 can be any type, provided that it is capable of adjusting the pressure of the fluid in some manner in response to an electrical pulse sent to electromagnet 36. For example, valve 35 and electromagnet 36 can be of the kind described in Italian Patent Application No. 67092-A/80 filed on Jan. 23, 1980.

It may be appropriate, but not necessary, to fluidly couple to duct 34 a delaying valve 38 positioned after or downstream of the pressure regulating valve 35. The delaying valve 38 is operated by electromagnet 39 in response to various feed conditions downstream from the delaying valve 38 so as to regulate the hydraulic fluid in such a way that the pressure is between 0 and the pressure level of the fluid issuing from the pressure regulating valve 35. In other words, delaying valve 38 can maintain the pressure in duct 34, or it can reduce the pressure in duct 34 to nothing downstream from or after valve 38 by closing valve 38. Hence, delaying valve 38 may not be appropriate, but it operates each of the clutches 23 and 25 such that they perform gradually and without jerking, thus obtaining a smooth and regular engagement of both the forward and reverse gears. A shunt 43 fluidly connected with duct 34 can appropriately feed hydraulic fluid to valves 30 and 38.

Duct 44 which is fluidly connected with duct 34 downstream of or after pressure regulating valve 35, connects the pressure regulating valve 35 with hydraulic cylinder 17, which actuates friction clutch 16 and its corresponding two half joints 13 and 14. A delaying valve 45 similar to delaying valve 38 is in fluid communication with duct 44 such that clutch 16 can be engaged gradually and without jerking as is accomplished with clutches 23 and 25. The delaying valve 45 has an associated electromagnet 46 which controls valve 45 in the safe manner as delaying valve 38. For feeding delaying valve 45, the hydraulic fluid may be transported through shunt 47 which is in fluid communication with duct 34.

A duct 48 in fluid communication with duct 29 between pump 28 and flow regulating valve 30, feeds hydraulic fluid to hydraulic cylinder 7 which controls the displacement of moving disk 4 of the freely rotating pulley 2. Valve 49, positioned in duct 48, functions to prevent hydraulic fluid from flowing in duct 48 to hydraulic cylinder 7 if the pressure in duct 29 is lower than a predetermined or preestablished pressure. If the pressure in duct 29 is higher than the pre-established pressure, valve 49 permits hydraulic fluid to flow through duct 48 to hydraulic cylinder 7. Valve 49 also is in fluid communication with drain line 48a which permits the collapse of hydraulic cylinder 7 whenever the pressure in line 29 is low. The hydraulic fluid flows from cylinder 7 to the source of hydraulic fluid 55. When driving shaft 8 is under certain low torque conditions, driving pulley 1 is capable of operation even when the pressure of the hydraulic fluid inside the hydraulic cylinder 7 is very low or naught. Under these conditions the energy consumption for the automatic transmission is very low, particularly because of the reduced frictional torques occurring under such circumstances on pulleys 1 and 2.

Annular recess 16a inside clutch 16 of joint 10 is fluidly connected with duct 50 through duct 50b and shunting valve 51. Shunting valve 51 has two positions. The first position (appearing on the drawing) illustrates the position of the shuttle 52 as it permits hydraulic fluid under pressure from pump 28 to flow from duct 50 through duct 50b to recess 16a. In the second position, shuttle 52 is moved upwardly within shunting valve 51, and recess 16a is now fluidly connected to the source of hydraulic fluid 55. Shuttle 52 is normally in the second position when hydraulic cylinder 16 is disengaged, thus permitting hydraulic fluid to flow from recess 16a to valve 51 by means of duct 50b, and from valve 51 to the source of hydraulic fluid 55 by means of duct 50 and valve 41. The operating position of shuttle 52 is controlled by the pressure of the fluid in duct 44 which is fluidly connected with shunting valve 51 through the shunt 44a.

An overpressure relief valve 53 connects duct 29 to the discharge duct 50, upstream or before pressure regulating valve 35.

Electric pulses or signals sent to electromagnets 31, 36, 39 and 46 can conveniently originate from an electronic switch point or control 54 which processes electronic pulses or signals from transducers which sense various operating conditions of the motor vehicle.

It is obvious that the above described apparatus can undergo minor differences without leaving the field of the present invention. In particular, delaying valves 8 and 45 may be omitted which will eliminate the gradual engaging of clutches 16, 23 and 25. However, the gradual engaging of clutches 16, 23 and 25 can be obtained through other means such as mechanical devices. Valve 49 may also be omitted without prejudicing the function of the present invention. In this condition, the control of hydraulic cylinder 7 will occur under any existing operating conditions which control hydraulic cylinder 6. Under such circumstances, however, the present apparatus would consume higher energy to obtain the same output.

What is claimed is:

1. A continuous automatic gear box for a motor vehicle comprising:

a driving shaft;

a reduction-reversing means mechanically coupled to said driving shaft; a driving pulley mechanically coupled to said reduction-reversing means, so that when said reduction-reversing means is engaged, motion from said driving shaft is transmitted to said driving pulley;

a freely rotating pulley;

an endless belt for transmitting motion from said driving pulley to said freely rotating pulley, said endless belt having a winding radius for each of said pulleys, said winding radius comprising the distance between the center of rotation of either pulley and the closest point of the endless belt;

said driving pulley and said freely rotating pulley each comprising movable and stationary disks, said movable disk being axially movable relative to said stationary disk by means of an hydraulic cylinder in order to vary the winding radius of said belt on each of said pulleys;

said reduction-reversing means including a first and second clutch, said clutch when engaged transmits motion from said moving shaft to said driving pulley designed to propel the motor vehicle forwardly, said second clutch when engaged transmits motion from said driving shaft to said driving pulley designed to propel said motor vehicle in reverse movement; and a control means for controlling said movable disk of each of said pulleys, and said first and second clutch of said reduction-reversing means, said control means comprising:

a source of fluid under pressure;

a flow regulating valve;

a main duct connecting said source of fluid under pressure to said flow regulating valve and from said flow regulating valve to said movable disk on said driving pulley;

a second duct fluidly connected to said movable disk of said freely rotating pulley;

a pressure regulating valve;

a selective valve; and a third duct fluidly connected with and from said main duct to said pressure regulating valve, and from said pressure regulating valve to said selecting valve, and from said selecting valve to said first and second clutches of said reduction-reversing means, said third duct being connected to said main duct upstream from said flow regulating valve.

2. The continuous automatic gear box of claim 1, further including a delaying valve fluidly connected to said third duct between said pressure regulating valve and said selecting valve, said delaying valve functions to gradually engage said first and second clutches of said reduction-reversing means to obtain smooth and regular engagement for both forward and reverse movements of said motor vehicle.

3. The continuous automatic gear box of claim 2, wherein said pressure regulating valve, said flow regulating valve and said delaying valve are all actuated by respective electromagnets.

4. The continuous automatic gear box of claim 3, further including an electronic control system which senses various operating conditions of the motor vehicle, and based upon a preestablished logic, transmits electric signals to said respective electromagnets for controlling each of said pressure regulating valve, delaying valve and flow regulating valve.

5. The continuous automatic gear box claimed in claim 1, wherein said flow regulating valve includes a shunt duct to permit said movable disk of said driving pulley to move axially away from said stationary disk of said driving pulley.

* * * * *